March 6, 1928.  1,661,673

B. NEAL ET AL

DRIVING MECHANISM FOR PRODUCING GYRATORY MOTION OF A SUSPENDED BODY

Filed Sept. 7, 1923

Inventors
Burton Neal and
George H. Hebebrand

By Bruce S. Elliott
Attorney

Patented Mar. 6, 1928.

1,661,673

UNITED STATES PATENT OFFICE.

BURTON NEAL, OF ST. LOUIS, AND GEORGE H. HEBEBRAND, OF KINLOCH, MISSOURI.

DRIVING MECHANISM FOR PRODUCING GYRATORY MOTION OF A SUSPENDED BODY.

Application filed September 7, 1923. Serial No. 661,355.

This invention relates to driving mechanism for use in producing gyratory movement, and has for its object, the provision of certain improvements in the mechanism described and claimed in our prior Patent No. 1,434,252, dated October 31st, 1922.

As in said patent, the object of the present invention is to provide driving mechanism for producing gyratory movement of a body, such as a sifting machine, which will be self-balancing from the start to the maximum number of revolutions provided for.

In the machine of our prior patent, the driving part or mechanism, involving a shaft driven from a pulley, occupies a fixed centered position, while the driven part, including the sifter to which the gyratory motion is to be imparted, is gradually thrown off-center, so that its central median line or axis shall travel in a circular path. In this construction, a central or driven shaft was fixedly secured to a driven member and the thrust of the sifter was borne by this shaft. While the operation in this respect was satisfactory, and proceeded along the lines indicated, it was found that a shaft of relatively large diameter had to be used to withstand bending strain, and that the wear on the shaft was excessive, as it occurred almost entirely on one side of the shaft, due to the fact that the sifter does not rotate, and hence it soon became necessary to renew the driven shaft.

This objection is overcome, in the present form of our invention, by mounting the weight on a support which is rotatably mounted on a casting secured directly to the sifter, and mounting the drive pulley on one of these supports, either that at the top or bottom of the sifter, so that all of the strain incident to the force exerted by the weights is borne by the sifter itself and not by the shaft, the latter being simply used to connect the driven members at the top and bottom of the sifter so that the rotation thereof may be uniform. In other words, the shaft which we now employ is of the order of a floating shaft, and it has to withstand no other strain than that exerted by the pulley mounted on one of its ends, in rotating it, and through it, the driven member at its other end.

Again, in our prior device, the leverage afforded by the groove in the center of the roller, was uniform throughout, so that the pull exerted by the spring, under centrifugal force, was the same at the beginning of the movement as at its completion. As compared with other devices, the gyratory movement was initiated and maintained with the minimum of irregular motions or vibrations, with our prior device. Nevertheless, we have found that greater increase in the ease and uniformity with which the gyratory motion can be initiated and maintained, may be attained by providing for a gradually increasing degree of leverage to be afforded by the rolling weight as it is moved outward under centrifugal action, in recognition of and compensation for the fact that the further the weight moves away from the center of rotation, the greater the centrifugal action. Thus, as the weight starts to move outward, it encounters, from the pull spring and cable governing its movement, a gradually increasing resistance. It will, therefore, move outward more slowly, and start the gyratory movement gradually and uniformly, as compared with the more sudden initiation of the movement in our prior device, due to the fact that no compensation was made for the increasing rapidity of the outward movement of the weight as it receded from the center of motion. In other words, the power of the springs had to be such as to exert the requisite degree of resistance to the outward movement of the weight when the latter was in its extreme outward position and the centrifugal force exerted at its highest. Necessarily, therefore, this power of the spring could not so readily be overcome to permit the outward movement of the weight when the latter was near the center of the device, and the centrifugal force at its minimum. Hence, the weight would not start out gradually with the beginning of rotation of the shaft, but would only begin its outward movement after the shaft had approached its maximum speed of rotation, and when it did start its outward movement, such movement was made with gradually increasing speed the further the weight receded from the center of rotation, instead of at a uniform rate of speed. In our present arrangement, however, the gradually increasing leverage afforded, enables the pull spring to exert a gradually increasing amount of resistance to the outward movement of the weight, this resistance being at the minimum when the weight is near the center, and at the maximum when it is at its extreme outward position.

In the accompanying drawing—

Figure 1:
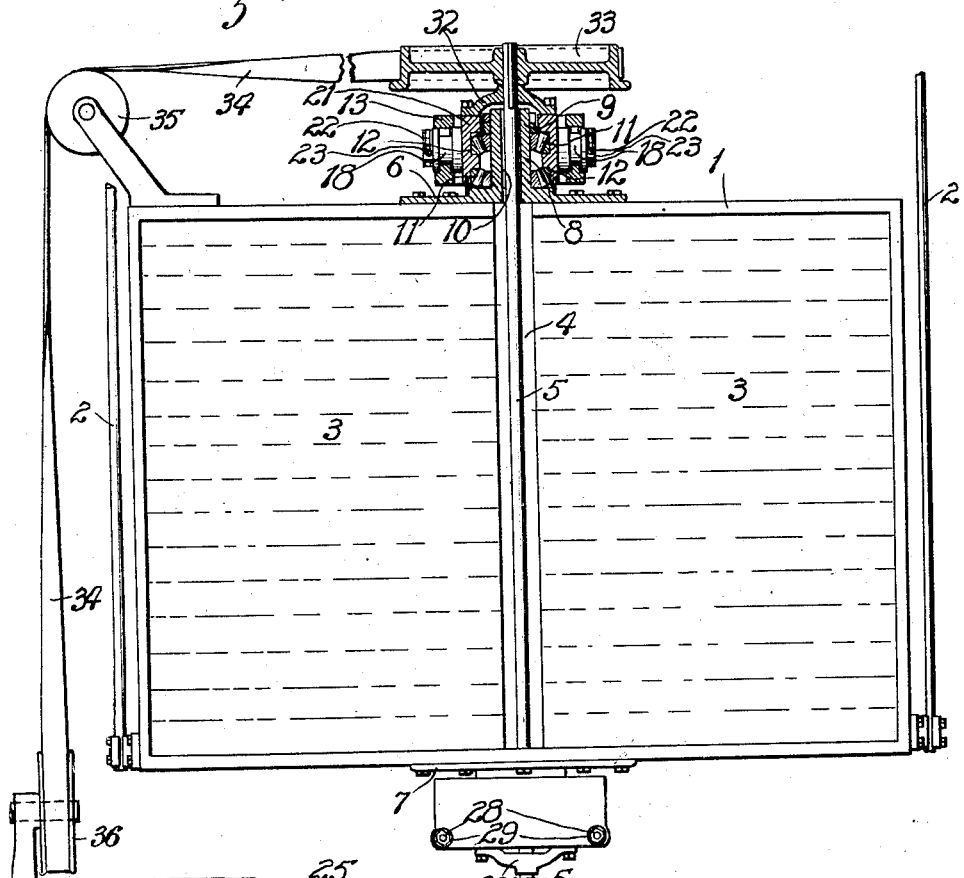
Figure 1 is a view in end elevation of a plansifter provided with our improved self-balancing mechanism for producing gyratory motion thereof, the mechanism at the top of the sifter, including the driving pulley, being shown in section; the section being taken on the line 1—1 of Figure 2.
Figure 2:
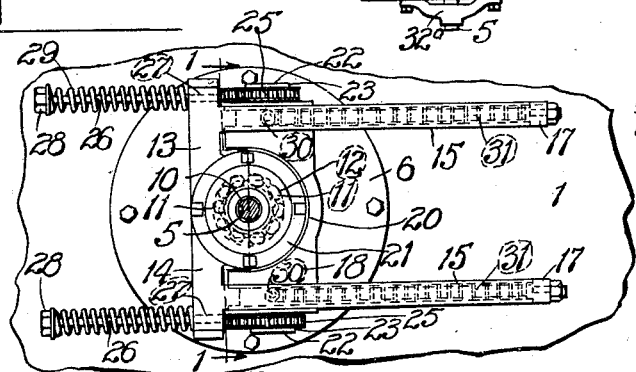
Figure 2 is a sectional plan view on an enlarged scale showing the present form of mechanism for producing gyratory motion.

Referring now to these drawings, the numeral 1 indicates, generally, a multiple plansifter machine suspended from its four corners by means of wooden rods 2, as usual with plansifter machines. The machine, as shown, comprises two sections of sieves, indicated by dotted lines at 3, and between these sections at the center of the machine, a vertical space 4 is provided through which extends a driven shaft 5. Mounted on the top and bottom of the machine, centrally thereof, are castings 6 and 7, respectively. These castings, and the parts associated therewith, are the same at the top and bottom of the machine, with the exception of the provision of a drive pulley, and the construction at the top of the machine will, therefore, be described, the same being shown in section for this purpose, in Figure 1. The casting 6 has a central circular portion 8 elevated above the plane of the main portion of the casting, and projecting upward from the central portion of this latter part of the casting, is a cylindrical extension 9, the parts 6, 8 and 9 being cast as an integral structure and having a vertically disposed bore 10 extending upward through the same. At its base, and toward its upper end, the cylindrical extension 9, which forms a bearing, is provided with race-ways for cone bearings 11 which are supported between said race-ways and similar race-ways provided in a circular portion 12 of a casting 13 which is thus rotatably mounted in roller bearings upon the bearing 9. The casting 13 comprises a back-plate 14 formed integral and extending outwardly from near either end of which are two rails 15 and 16, the two rails being connected at their outer end, as indicated at 17. The numeral 18 indicates a rolling weight which is provided with circular portions 19, at either end, which are located between the two rails 15 and 16. The upper rail 15 is merely a guard rail, the weight being supported for movement at its ends, on the lower rail 16. The central portion of the weight 18 is cut away to form a curved recess 20 which is adapted to extend around a central circular projection 21 of casting 13 which accommodates the circular portion 12 containing the cone bearings 11 previously referred to. This recess enables the weight 18 to be normally positioned with its longitudinal axis only slightly to one side of the axis of the driven shaft 5 so that the force exerted by centrifugal action will be less at the beginning of rotation, thus insuring a more gradual outward movement of the weight, than if the weight were normally positioned further to one side of the axis of the driven shaft, in which position the initial force exerted by centrifugal action will be more pronounced, producing a more abrupt initiation of the gyratory movement. At either end the roller 18 is provided with a projection 22 presenting a spiral surface 23, the spiral starting from the center of the roller. Secured at one end at the center of each projection 22, as indicated at 24, is a cable 25 which extends about the spiral surface 23 and at its other end is connected to one end of a rod 26 which extends through an opening 27 in the back plate 14, each of said rods being provided at its outer end with a nut 28 between which, and the face of the back wall 14, there is located a coil spring 29 which normally presses the nuts 28 and rods 26 outward. Secured at one end to the periphery of the roller 18, at either end of said roller, as indicated at 30, are cables 31, the other end of each of which is secured in the connecting member 17 at the ends of the rails 15, 16, said member 17 acting as a guard or stop to limit the outward movement of roller 18. The chains 31 act in the manner of fulcrums for the roller 18, converting it, relative to the pull of the springs 29, into a lever of the third order.

The casting 13, or the circular portion 21 thereof, housing the cone bearings 11, has secured thereon a cap 32 which is splined on the upper end of shaft 5 and also splined on this shaft, above the cap, is a pulley 33 which is adapted to be driven by a belt 34 passing over guide pulleys 35 mounted on the top of the sifter 1, and over similar guide pulleys 36 secured on the floor or other convenient part of the building, said belt being driven from any suitable source of power in the usual way.

At the bottom, the construction is the same as that at the top except that no pulley is provided and the shaft 5 is simply splined in the cap mounted on the casting containing the bearings, which cap corresponds, of course, to the cap 32 previously described, and is indicated by the reference character 32ª.

Figure 3:
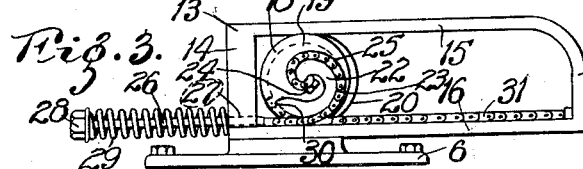
Figure 3 is a view in side elevation of said mechanism.

In operation, power being applied to the belt 34, the pulley 33, shaft 5, and casting 13 will be rotated. The weight 18, being slightly to one side of the axis of rotation, or shaft 5, will be moved outward by centrifugal action, its circular end portions rolling on the rail 16. Although the effect of centrifugal action upon the weight is not very great initially, owing to its position near the axis of rotation, nevertheless the weight readily starts to move outward, as the leverage afforded by the outer surface of the spiral-shaped projection 22, near the periphery of the roller, is not very great. However, as the roller moves further outward, the cable 23 unwinds from the spiral surface and the point of application of the pull of said cables under the power of springs 29 gradually advances toward the center of the roller and further away from the fulcrum points 30, which are the points of connection of the cables 31 to said roller, and hence the resistance to the outward movement of the weight greatly increases as centrifugal action increases, the pull of the springs 29 tending, of course, to move the roller to the left, as shown in Figure 3, while centrifugal action tends to move the roller toward the right. The power of the springs 29 is such, and the weight of the roller 18 is so adjusted, that the latter will slowly move outward or toward the right, winding up the cables 31 on its periphery and unwinding the cable 23 from the spiral surface of the projection 22. This outward movement of the weight is, of course, produced by centrifugal action and continues until the weight comes in contact with the guard or stops 17 at the ends of the rail 16. This gradual regulated outward movement of the weight insures a gradual and smooth initiation of the gyratory motion of the sifter 1, practically eliminating all vibration or shaking of the sifter, and thus minimizing strain on the machine, wear and tear on the bearings, and reducing to the point of practically preventing all vibration or shaking of the building.

We claim:

1. In driving mechanism for producing gyratory movement of a suspended body, in combination with a member rotatably mounted on the body, a rolling weight mounted on said member to one side of its axis of rotation and having a reduced portion presenting a spiral surface, a cable secured at one end centrally of said reduced portion and wound about the spiral surface thereof and having its outer end passed from the underside of said reduced portion, a coil spring mounted on said member, means for holding said spring under tension connected to the outer end of said cable, a second cable connected at one end to the periphery of said weight and passed from the underside thereof in a direction opposite to that of the first named cable and fixedly secured at its outer end to said member, and means for rotating said member, whereby said weight will roll outward against constantly increasing resistance afforded by said spring, and thereby gradually produce the desired gyratory movement of the body.

2. In driving mechanism for producing gyratory movement of a suspended body, in combination with a member rotatably mounted on the body, a rolling weight mounted on said member to one side of its axis of rotation and having at each end a reduced portion presenting a spiral surface, a cable secured at one end centrally of each of said reduced portions and wound about the spiral surface thereof and having its outer end passed from the underside of the reduced portion, a coil spring mounted on said member in line with each of said cables, means for holding each spring under tension connected to the outer end of a corresponding cable, a pair of cables, each of which is connected at one end to the periphery of said weight toward its outer ends and passed from the underside thereof in a direction opposite to that of the corresponding first named cable and fixedly secured at its outer end to said member, and means for rotating said member, whereby said weight will roll outward against the resistance of said spring and afford gradually increasing leverage through which the springs exert their pulling or retarding action on the roller.

3. In driving mechanism for producing gyratory movement of a suspended body, in combination with a casting secured on said body and affording a bearing, a member having a housing rotatably mounted on said bearing, a rolling weight mounted on said member and centrally recessed on one side to receive said housing and enable the axis of the weight to closely approach the axis of rotation of said housing, said weight having a reduced portion, a cable secured at one end to and wound on said reduced portion and having its outer end passed from the underside thereof, a coil spring mounted on said member, means for placing said spring under tension connected to said cable, a pair of cables, each of which is connected at one end to the periphery of said weight and passed from the underside thereof in a direction opposite to that of the first named cable and fixedly secured at its outer end to said member, and means for rotating said member, whereby said weight will gradually roll outward against resistance afforded by said spring.

4. In driving mechanism for producing gyratory movement of a suspended body, in combination with a member rotatably mounted on the top of the body, a corresponding member rotatably mounted on the bottom of the body, a shaft connecting said two members, means for rotating said shaft and thereby the two members, a rolling weight mounted on each of said members to one side of its axis of rotation and having a reduced portion, a cable secured at one end to and wound on the reduced portion of each of said rollers and having its outer end passed from the underside of the reduced portion, a coil spring mounted on each of said members, means for holding each of said springs under tension connected to the outer end of the respective cables, a pair of cables, each of which is connected at one end to the periphery of a weight and passed from the underside thereof in a direction opposite to that of the first named cable and fixedly secured at its outer end to one of said members, whereby, when said members are rotated, said weights will roll outward against resistance of their springs and thereby gradually produce the desired gyratory movement of the body.

5. In driving mechanism for producing gyratory movement of a suspended body, in combination with a casting secured on said body and affording a cylindrical bearing, a member having a housing rotatably mounted on said bearing, a rolling weight mounted on said member to one side of its axis of rotation, spring-governed means for controlling the movement of said weight, a pulley fixedly secured to said member, and means for driving said pulley and thereby rotating said member, whereby said weight will roll outward against resistance offered by said spring and thereby gradually produce the desired gyratory movement of the body.

6. In driving mechanism for producing gyratory movement of a suspended body, in combination with a casting secured on said body and affording a hollow cylindrical bearing, a corresponding casting mounted on the bottom of said body, a member having a housing rotatably mounted on said bearing, a corresponding member rotatably mounted on the bearing at the bottom of the body, a shaft connecting said two members and extending through said hollow bearings, a rolling weight mounted on each of said members to one side of its axis of rotation, spring-governed means for controlling the movement of each of said weights, a pulley fixedly secured to one of said members, and means for driving said pulley and thereby rotating said members in unison, whereby said weights will roll outward against resistance of said springs and thereby gradually produce the desired gyratory movement of the body.

In testimony whereof, we have hereunto set our hands.

BURTON NEAL.
GEORGE H. HEBEBRAND.